United States Patent [19]

Supernaw

[11] 3,730,121
[45] May 1, 1973

[54] ACOUSTIC TORPEDO TEST APPARATUS

[75] Inventor: Dwight L. Supernaw, Baltimore, Md.

[73] Assignee: The United States of America as represented by the Secretary of the Navy

[22] Filed: Feb. 19, 1963

[21] Appl. No.: 259,762

[52] U.S. Cl. ..........................114/20, 73/67.5, 73/69, 324/56
[51] Int. Cl. ..........................F42b 19/01, F42b 19/04
[58] Field of Search ..................35/10.4; 73/69, 67.5, 73/67.6, 67.7, 67.8, 67.9; 324/56; 114/23

[56] References Cited

UNITED STATES PATENTS

| | | | |
|---|---|---|---|
| 2,532,507 | 12/1950 | Meunier | 73/67.5 |
| 2,713,729 | 7/1955 | Springer | 35/10.4 |
| 2,913,602 | 11/1959 | Joy | 73/67.5 |
| 2,994,135 | 8/1961 | Bureke et al. | 35/10.4 |
| 3,008,244 | 11/1961 | Lindley | 35/10.4 |

*Primary Examiner*—Samuel Feinberg
*Assistant Examiner*—James M. Hanley
*Attorney*—Q. B. Warner, V. C. Muller and P. H. Firsht

EXEMPLARY CLAIM

2. An inverse transducer device for use in transmission of acoustic signals to the generally convexly-faced transducer of an acoustic-homing torpedo, under test, in a manner simulating underwater target signals, said device comprising:
   a hermetic housing having two opposite ends thereof formed as normally planar flexible diaphragms,
   one said diaphragm serving as the face of said device,
   said housing being filled with liquid,
   whereby said device is adapted to accommodate intimate face-to-face contact with said torpedo transducer,
   an array of electro-acoustic transducer elements supported within said housing with the acoustic axis of said array extending through said face,
   and said diaphragms and liquid having acoustic transmission characteristics substantially duplicating that of seawater.

3 Claims, 4 Drawing Figures

INVENTOR.
DWIGHT L. SUPERNAW
BY
V.C. Muller
ATTORNEY

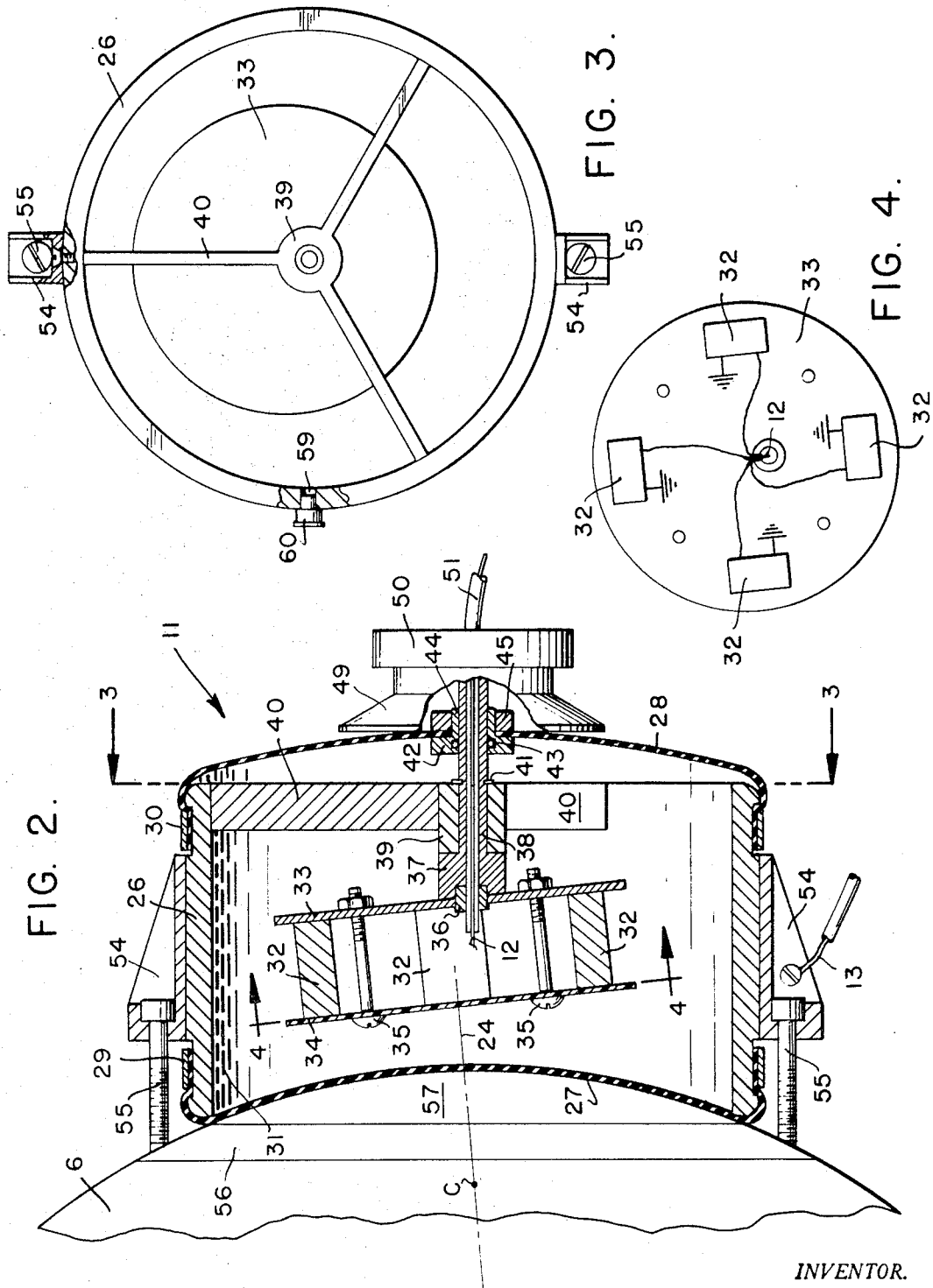

ACOUSTIC TORPEDO TEST APPARATUS

The invention relates to underwater ordnance test apparatus, and more particularly to test apparatus including an inverse transducer and an associated test set for use in determining overall operativeness of acoustic homing torpedoes.

Torpedoes designed for underwater attack against enemy ships and submarines are modernly of acoustic homing type, constructed as an assembly of various electro-acoustic, electronic and other types of apparatus in physically separable sections with separable connections therebetween. Such sectional construction of the torpedo and the grouped arrangement of its internal apparatus simplify construction and assembly, and further enable later access as necessary for detailed inspection, servicing and adjustment which must be made, for example, following underwater test or proofing runs, or in preparation of torpedoes to place them in final readiness for delivery to the vessels in which they are to be stored and from which at some later time they are to be launched against enemy targets.

There are known and available certain specialized types of electronic test equipment, specifically designed for use in checking and adjusting torpedo circuits but requiring direct electrical connection to disassembled torpedo sections, and such equipment is of course necessary for securing optimum adjustments. However, such prior art equipment provides no means for checking sensitivity, directional response and other characteristics of the entire torpedo system, including the transducer, as a complete assembly. While cursorily it might appear that an acoustic-homing torpedo would without question be in ready condition after having been serviced, adjusted piecemeal by the use of such prior art electronic test equipment, and re-assembled, there nevertheless remains the possibility of subsequent torpedo performance inadequacy, or even inoperativeness, for example due to some fault arising during torpedo-re-assembly, such as injury to components or to their interconnections, or faulty connector action, or failure to properly establish all the necessary connections in the course of torpedo re-assembly, or due to some internal injury which may occur during later transportation and handling. No suitable techniques or means have heretofore been available for enabling a direct determination to be made of overall readiness of a completely assembled acoustic-homing torpedo.

The present invention makes it possible to check the major operational characteristics and readiness of a completely assembled acoustic-homing torpedo, by generating, controlling and externally applying certain test acoustic signals directly and exclusively to the search-pulse projecting and/or target-sensing electro-acoustic transducer of the torpedo, the test signals simulating, to a degree adequate for test purposes, acoustic signals as would occur during underwater operation of the torpedo in search for and in pursuit of a target. In accordance with the present invention, there are provided an electro-acoustic transducer device, here termed an inverse transducer to distinguish it from that used in the torpedo itself, having novel structure which adapts it to make intimate face-to-face contact against the torpedo transducer, to receive acoustic search-pulses therefrom in active-acoustic operation, and to simulate off-axis underwater transmission of acoustic signals thereto, and an electronic test set having novel circuitry which functions to receive torpedo search-pulse signals, and to generate test signals and control their application to the inverse transducer, in a manner enabling checking of torpedo operation characteristics.

It is therefore the principal object of the present invention to provide an electro-acoustic apparatus, including an inverse transducer and an electronic test set, for use in determining operativeness and readiness of a completely assembled acoustic-homing torpedo.

Another object of the invention is to provide an inverse transducer capable of full face contact against the target-sensing transducer of a torpedo under test, and controllable to transmit acoustic signals to the torpedo under test in a manner simulating selected off-axis target directions.

A further object of the invention is to provide a simplified yet effective electro-acoustic apparatus for generating test reverberation and target signals suitably duplicating the timing, magnitude and source direction of acoustic signals as would be received by a torpedo during underwater operation thereof in search and pursuit of a target.

These and other objects and features and many of the attendant advantages of the invention will be appreciated as the invention becomes better understood by reference to the following detailed description when considered in connection with the accompanying drawing wherein:

FIG. 2 illustrates in major detail an inverse transducer device which enables application of acoustic signals to a torpedo under test;

FIG. 3 is a cross-sectional view taken on line 3—3 of FIG. 2; and

FIG. 4 is a plan view of the inverse transducer crystal arrangement taken on line 4—4 of FIG. 2.

Figure 1:
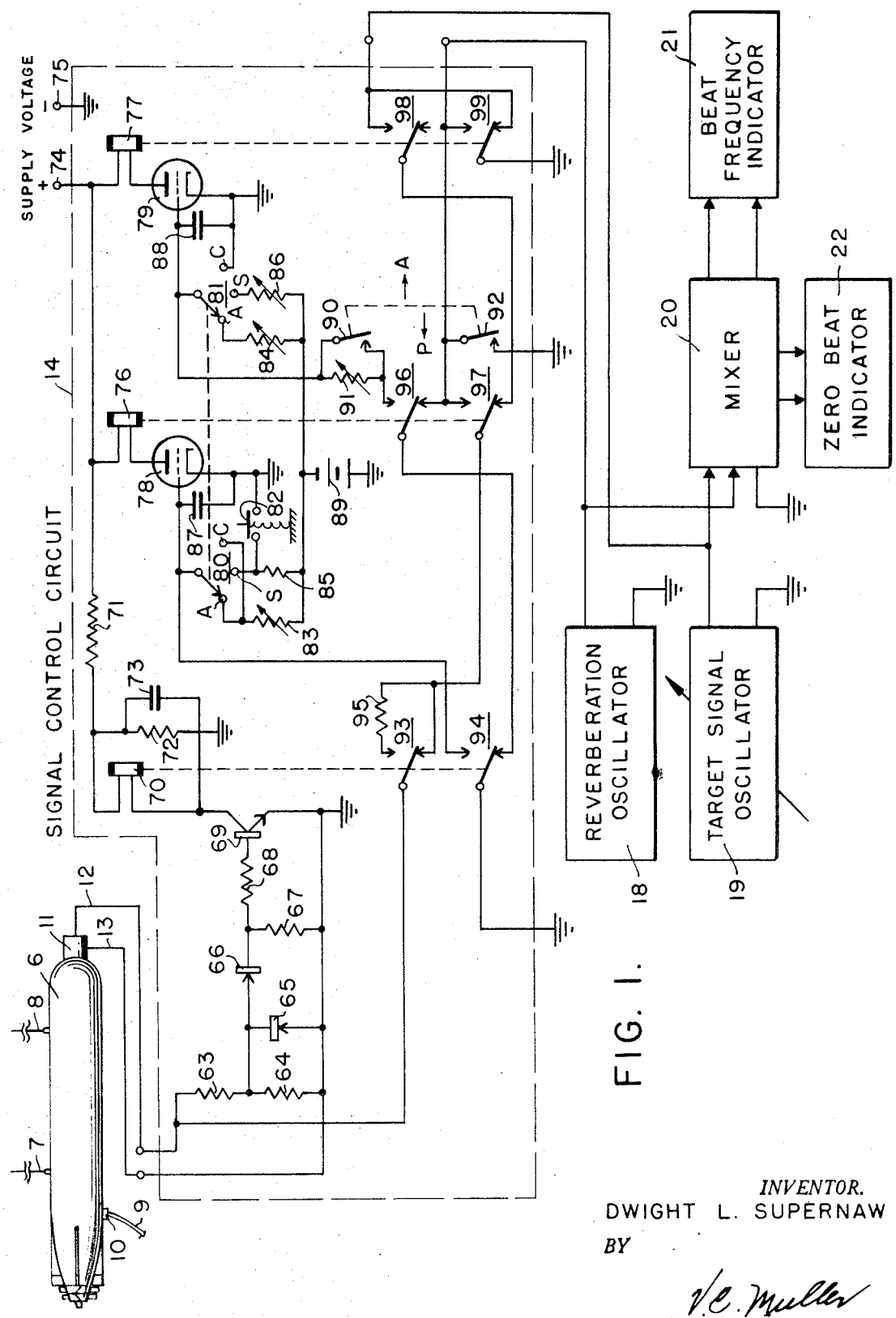
FIG. 1 illustrates an exemplary embodiment of the complete electro-acoustic test system.

Referring to the exemplary complete system illustrated in FIG. 1, and first briefly considering torpedo operation in order to better understand the functions of the novel inverse transducer and of the novel simplified test set which supply simulated underwater signals, acoustic-homing torpedo 6 may be of advanced type capable of both passive-acoustic and active-acoustic modes of operation, adapted to be selectively preset for operation in either mode, or to automatically switch from one to the other as may be demanded by condition changes during the target detection and target pursuit phases. For the purpose of detecting target direction in both azimuth and elevation, torpedo 6 may employ a quadrantally-sectioned electro-acoustic transducer (such as that described in U. S. Pat. No. 3,025,493 to H. Brooks, entitled "Balanced Input Circuit") mounted in the nose section of the torpedo in accordance with conventional usage. In passive-acoustic operation, target presence and direction information is derived from ultrasonic noise as received at the several sections of the torpedo transducer, the ultrasonic noise arising directly from the target ship or submarine and being of either continuous or of so-called "spike" character. In active-acoustic operation, the torpedo generates and projects search-pulses of ultrasonic energy and, from the resultant target echo (again, as received at the several sections of the torpedo transducer), determines target presence and direction, provided that the target echoes are received at large enough signal-to-noise ratio and exhibit sufficient doppler frequency shift relative to reverberation, and provided that the reverberation sampling and ODN (own-doppler nullifier) circuits of the torpedo operate properly in a manner enabling discrimination of target echoes from reverberation (for example as detailed in U. S. Pat. No. 3,024,755 to H. Brooks, entitled "Torpedo Echo Steering System").

In preparation for torpedo testing, torpedo 6 may be suspended in any desired attitude, by means of cables 7 and 8 depending from hoist mechanisms (not shown), or mounted in other manner enabling angular displacements as sometimes desired for observation of resultant torpedo steering reactions; for test purposes the torpedo is energized through a cable 9 leading to a connector 10 which mates with a hermetic electrical connector (not shown) provided in the torpedo in accordance with conventional practice.

INVERSE TRANSDUCER

The inverse transducer, forming part of the external electro-acoustic test equipment, and positioned against the transducer nose of the torpedo as indicated schematically at 11, is connected through leads 12 and 13 to the signal control circuit 14 of the test set, the test set further including reverberation oscillator unit 18, target signal oscillator unit 19, mixer 20, beat frequency indicator 21 and zero beat indicator 22. A prototype inverse transducer 11 which has been found to operate very satisfactorily is illustrated in detail in FIGS. 2, 3 and 4. Inverse transducer 11 in this instance employs a crystal array, mounted within cylindrical housing 26 in a manner enabling nutation of the array axis to various angular positions relative to the torpedo transducer axis. Rubber diaphragms 27 and 28, secured to the forward and rear ends of housing 26 by means of straps 29 and 30, respectively, serve to complete an enclosure which is filled with any suitable transducer oil 31 for use as a sound-transmission medium equivalent to seawater; such arrangement enables conforming face-to-face contact of transducer 11 against the nose of torpedo 6 and without disturbing the completely oil-filled condition of housing 26. One face of each of the four piezo-electric crystals 32 is preferably conductively bonded and grounded to a rear metal plate 33, and these crystals are sandwiched between that plate and a cellulose acetate or other plastic plate 34 by means of clamping bolts 35. Secured to the rear metal plate 33, eccentrically as shown, is a cylindrical member 36 which is joined to the enlarged end 37 of hollow shaft 38, in such manner that the axis of the array of crystals 32 makes an angle of say about 6° to the axis of shaft 38, with the array axis directed toward the effective acoustical center C of the torpedo transducer. Shaft 38 is rotatably supported in centrally-located boss 39 of spider member 40 which is secured to housing 26 (FIGS. 2 and 3), shaft 38 being constrained against axial displacement by means of lock ring 41 and the shouldered engagement of enlarged end 37 against boss 39. Rotation of shaft 38, and sliding displacement of rear diaphragm 28 relative to shaft 38, are accommodated by an oil-seal bushing which enables leakage-proof passage of shaft 38 through the diaphragm, this bushing comprising a member 42 carrying an oil-seal 0-ring 43 and having a ferrule 44 extending through diaphragm 28, ferrule 44 being engaged by a clamping member 45 in a manner to seal diaphragm 28 between members 42 and 45. Nutational displacement of the crystal array is controlled by dial 49 which is secured to shaft 38 and marked (not shown) in any manner suitable to indicate relative target direction simulated by the crystal array orientation within the inverse transducer. For in-phase excitation of the four crystals 32 by the associated test set, their active faces are connected to a common lead 12, as indicated schematically in FIG. 4, lead 12 extending through the bores of shaft 38 and dial knob 50, for connection to the test set. Insulation 51 of lead 12 in this instance also serves to seal the bore of shaft 38 against oil leakage. Lead 13 makes electrical connection to the grounded faces of the four crystals 32 through conductive continuity between lowermost bracket 54, housing 26, spider member 40, boss 39, shaft 38 and rear plate 33. Brackets 54 enable inverse transducer 11 to be mounted, by means of bolts 55 threadedly engaging the peripheral metal housing 56 of the torpedo transducer, in proper position and close engagement against the rubber face 57 of the torpedo transducer. For convenience in the oil-filling operation, housing 26 may be provided with a port 59 and a sealing plug 60, shown in FIG. 3.

ELECTRONIC TEST SET

Referring to FIG. 1, it will be understood that signal control circuit 14 and remaining units of the test set may be contained in a single console or cabinet, with variable operating controls and indicators (such as signal control circuit function selector, oscillator frequency adjustment dials, signal attenuator dials, signal amplitude indicators, beat-frequency indicator, etc.) panel-mounted in a manner enabling convenient manipulation and observation. Oscillators 18 and 19 run continuously and their output signals are controlled and selectively applied to inverse transducer 11 by signal control circuit 14 in a manner later described in detail. Oscillator units 18 and 19 are also to be understood as conventionally including signal level indicators and attenuators (not shown) for providing signals at adjustable and known levels, so that torpedo response thresholds can be determined. Reverberation center-frequency is a function principally of search-pulse frequency and torpedo speed, and since these parameters are substantially constant for a given torpedo of single-speed type, reverberation oscillator 18 may be of crystal-controlled fixed-frequency variety. For greater versatility, however, in checking torpedoes of various types wherein reverberation therefore occurs at various center frequencies, an adjustable, stable, well-calibrated reverberation oscillator 18 may of course be utilized. In the present apparatus, oscillator 18 in any event provides reverberation test signals which, while not simulating reverberation frequency spread and reverberation decay as occur in actual practice, nevertheless simulate other reverberation characteristics and serve satisfactorily for checking torpedo receiver action and response; reverberation oscillator 18 further serves as the source of a reference signal for frequency comparison of test signals supplied by oscillator 19. Oscillator 19 is of variable frequency type as indicated and supplies test echo and noise signals; again, while the test echo and noise signals derived from oscillator 19 do not fully simulate those arising in actual practice, they are entirely satisfactory for torpedo checking purposes. Target signal oscillator 19 is made adjustable in order to provide target-echo signals at variable target doppler frequency (i.e., presenting frequency shift relative to reverberation), and likewise is to be understood as including a signal level indicator and attenuator (not shown) for providing signals at adjustable and known levels. For providing simplified but nevertheless precise frequency shift measurement of the signals provided by target signal oscillator 19, these signals are beat against the reference signal (provided by reverberation oscillator 18) in a suitable mixer-amplifier circuit 20, and the difference frequency is displayed by beat-frequency indicator 21 which may for example be of reed type having excellent inherent accuracy. Beat-frequency indicator 21 will be understood to have a frequency range adequate to encompass frequency deviations as presented by target echoes in actual practice, say ± 800 cps (cycles per second). Zero-beat indicator 22 is provided to facilitate setting of target signal oscillator 19 to substantially the same frequency as reverberation oscillator 18, as may at times be required.

SIGNAL CONTROL CIRCUIT

By means of function and mode selector switches, signal control circuit 14 can be set to accomplish testing of torpedo 6 in any desired type of operation, for active-acoustic mode of operation functioning in timed response to reception of a search-pulse (from torpedo 6 via inverse transducer 11) to first supply to inverse transducer 11 a simulated reverberation signal from oscillator 18, followed by a simulated target-echo pulse from oscillator 19, and for passive-acoustic mode of operation functioning to supply to inverse transducer 11 simulated target noise signals from oscillator 19 either continuously or in so-called "spike" (pulse) manner dependent upon the type of passive-acoustic operation selected.

The signal control circuit 14 in this instance includes a transistor-controlled relay which, when energized by an associated detector circuit in response to reception of a search-pulse from the torpedo via inverse transducer 11, initiates sequential energization of two tube-controlled relays which correspondingly set a brief period during which the reverberation signal is applied to inverse transducer 11, sufficing to satisfy reverberation-sampling and ODN circuit functions of torpedo 6; sequential drop-out of the relays results in another brief period during which the simulated target-echo signal is applied to the inverse transducer. In the detector circuit, in the active-acoustic mode of torpedo operation, resistors 63, 64 which are series-connected across the leads 12, 13 of inverse transducer 11 serve as an attenuator to apply only a fraction of the considerable search-pulse voltage to the shunt and series rectifiers 65 and 66. The resultant positive D.C. voltage pulse developed across resistor 67 is applied through limiting resistor 68 to the base terminal of transistor 69, causing conduction between the collector and grounded emitter of transistor 69 and thus completing the coil energization circuit of relay 70 through the voltage divider arrangement of resistors 71, 72. Capacitor 73 shunts the coil of relay 70 to delay relay release until a short time after search pulse termination, and such action correspondingly delays application, to inverse transducer 11 (and to the detector circuit), of the full reverberation signal, as will be better understood following description of circuit action in the active-acoustic mode of operation. The supply voltage which is applied to the voltage divider resistors 71, 72 of the detector relay circuit via terminals 74, 75 is applied to the less critical tube-controlled relays 76, 77 associated with tubes 78 and 79, respectively, without any voltage-divider or current-limiting arrangement. Ganged function-selector switches 80, 81 in this instance are of single-pole triple-throw variety and their throw positions are marked as indicated to set the signal control circuit for A (active), S (spike-noise) or C (continuous-noise) operation. A greater number of throw positions may of course be provided to accommodate additional signal durations or generation instants. The relay 76 circuit further includes a push-button switch 82 which, when operated at any chosen instant, initiates a relay operation sequence which produces the desired spike action. Resistors 83, 84 which form part of the RC combinations in the grid-to-cathode circuits of tubes 78 and 79, respectively, when switches 80, 81 are thrown to the A position for active-acoustic mode of operation, are made adjustable in order to set the echo-signal instant (relative to the search-pulse transmission instant) and the echo-signal duration, respectively. Resistors 85, 86 which are in circuit when switches 80, 81 are thrown to the S position for spike-noise mode of operation, respectively control the spike-noise signal generation instant (following release of pushbutton switch 82) and the spike-noise signal duration. Capacitors 87, 88 in the grid circuits of tubes 78 and 79, respectively, complete the RC combinations which set the charge and discharge times controlling relay 76 and relay 77 operation, as will appear. Tubes 78, 79 and corresponding relays 76, 77 are normally in OFF condition because of the biasing voltage provided by battery 89. Switch 90 is arranged to short resistor 91 during passive-acoustic mode of operation, resistor 91 being made adjustable to set reverberation duration during active-acoustic mode of operation; switch 92 ganged to switch 90 serves to ground out the reverberation signal during passive operation; ganged switches 90, 92 may be termed an A/P (active or passive) mode selector switch which is here shown distinct from the ganged function selector switches 80, 81 to simplify reading of the circuitry; the function and mode selector switches can otherwise be provided as a single, multiple-layer, ganged switch arrangement. Switches 93, 94 are controlled by relay 70; resistor 95 provides attenuation of the reverberation signal during the ON condition of relay 70. Switches 96, 97 and switches 98, 99 are controlled by relays 76 and 77, respectively.

In a quiescent condition as in FIG. 1, wherein each of the relays is OFF, no signals are passed to inverse transducer 11, the target signal provided by oscillator 19 being interrupted at relay switch 98 and grounded through relay switch 99, and the reverberation signal provided by oscillator 18 being grounded through relay switches 96 and 94.

CONTINUOUS-NOISE PASSIVE-ACOUSTIC MODE OF OPERATION

First considering the signal control circuit 14 action in the continuous-noise mode of passive-acoustic operation, with switches 90, 92 thrown to the P position and switches 80, 81 thrown to the C position, the reverberation signal is grounded through closed switch 92. The grounding of capacitor 88 and of the grid electrode of tube 79 result in an ON condition of relay 77, additionally grounding the reverberation signal through upwardly-closed switch 99, and applying the echo signal from oscillator 19 through upwardly-closed switch 98, downwardly-closed switch 97, downwardly-closed switch 93 and via lead 12 to inverse transducer 11.

SPIKE-NOISE PASSIVE-ACOUSTIC MODE OF OPERATION

Next considering in detail the sequential circuit actions during the spike-noise mode of passive-acoustic operation, with switches 90, 92 thrown to the P position and switches 80, 81 thrown to the S position, the reverberation signal is again grounded through closed switch 92, also through downwardly-closed switches 96 and 94, and the echo signal is grounded through downwardly-closed switch 99. The sequence of circuit actions is initiated by depressing pushbutton switch 82 of the tube 78 circuit, causing shorting and discharge of capacitor 87 and grounding of the grid electrode of tube 78 and thus energizing relay 76. Relay 77 also is energized, capacitor 88 being discharged and the grid electrode of tube 79 being grounded through closed switch 90, upwardly-closed switch 96 and downwardly-closed switch 94. During the time that both relays 76 and 77 remain energized, the reverberation signal remains grounded through closed switch 92, also through upwardly-closed switch 99; while the echo signal is transferred from ground to the upwardly-closed switch 98, the echo signal circuit remains incomplete until relay switch 97 closes downwardly upon de-energization of relay 76. Upon release of pushbutton switch 82, capacitor 87 is comparatively quickly charged by battery 89 through resistor 85 to a bias voltage which cuts off tube 78, de-energizing relay 76 and initiating application of a spike or pulse of noise through upwardly-closed switch 98, downwardly-closed switch 97, downwardly-closed switch 93, via lead 12 to inverse transducer 11; the downward closing of relay switch 96 and the downwardly-closed switch 94 establish an additional grounding path for the reverberation signal. Also at the time that relay 76 drops out to initiate the spike-noise signal, downwardly-closed switch 96 ungrounds capacitor 88 of the tube 79 and relay 77 circuit, capacitor 88 then charging toward cutoff bias voltage. When battery 89 has charged capacitor 88 sufficiently through resistor 86 to bias tube 79 to cutoff, relay 77 is de-energized, and relay switches 98 and 99 close downwardly, thus timing occurrence of the spike-noise signal at an instant determined by the setting of variable resistor 86 and returning signal control circuit 14 to a quiescent condition ready for recurrent spike-noise signal generation if desired.

ACTIVE-ACOUSTIC MODE OF OPERATION

Considering now in detail the sequential circuit actions during the active-acoustic mode of operation, with switches 80, 81, 90 and 92 thrown to the A position, relay 70 is energized during reception of a search-pulse and remains in ON condition for a short period following termination of the search-pulse because of the holdover action provided by capacitor 73. In such condition, switches 93, 94 are closed in an up position, switch 94 discharging capacitor 87 and grounding the grid electrode of tube 78, correspondingly turning tube 78 and relay 76 ON, and thus establishing a path for the reverberation signal to reach lead 12 of inverse transducer 11 from oscillator 18 through upwardly-closed switch 97 and through attenuating resistor 95 which is in the upwardly-closed switch 93 circuit. Upon dropout of relay 70, relay switch 93 closes downwardly and application of reverberation to lead 12 thus continues but without attenuation. The downward closing of switch 94 breaks the grounding connection to the tube 78 grid electrode and to capacitor 87, but tube 78 and relay 76 remain ON until capacitor 87 has charged sufficiently through resistor 83 to bias tube 78 to cutoff voltage, application of the reverberation signal ceasing prior to termination of this relay 76 ON-period, however, at the instant when relay 77 is energized due to sufficient discharge of capacitor 88, and application of the echo signal being later initiated upon termination of the relay 76 ON-period, as will appear, such period being variable by adjustment of resistor 83. The downward closing of switch 94 initiates timed discharge to ground of capacitor 88, in the tube 79 and relay 77 circuit, through series resistor 91 and upwardly-closed relay switch 96; when capacitor 88 has discharged sufficiently to turn tube 79 ON at an instant set by adjustment of variable resistor 91, relay 77 is energized, terminating the reverberation signal by grounding through upwardly-closed switch 99; although the echo signal is transferred from ground to the upwardly-closed switch 98 upon energization of relay 77, the echo signal circuit remains incomplete until relay switch 97 closes downwardly upon de-energization of relay 76. Such de-energization takes place when capacitor 87 has charged sufficiently from battery 89, under control of variable resistor 83, to bring the bias of tube 78 to cutoff value, at which instant relay switch 97 closes downwardly and applies the echo signal through relay switch 93 and via lead 12 to inverse transducer 11; at which instant, also, relay switch 96 closes downwardly, ungrounding capacitor 88 and initiating its charging toward cutoff bias voltage. When capacitor 88 has charged sufficiently through resistor 84 to bias tube 79 to cutoff value, relay 77 is de-energized, and relay switches 98, 99 close downwardly, thus terminating the echo signal at an instant determined by the setting of variable resistor 84 and returning the signal control circuit 14 to a quiescent condition awaiting the next transmission of a search-pulse by torpedo 6.

It will now be understood that the present invention provides an electro-acoustic test apparatus including a novel inverse transducer of structure enabling simulation of underwater transmission of acoustic signals to and/or from a torpedo under test, and a novel electronic test set for providing test signals to the inverse transducer in a manner to check a torpedo under test in any desired mode of operation. It will also be understood that the particular utility of the described electro-acoustic test apparatus is in its ability to check operativeness of a completely assembled torpedo under simulated conditions of underwater operation during both search and pursuit phases against a target.

Obviously many modifications and variations of the present invention are possible in the light of the above teachings. It is therefore to be understood that within the scope of the appended claims the invention may be practiced otherwise than as specifically described.

What is claimed is:

1. An electronic test set for use with an electro-acoustic inverse transducer in checking operativeness of an acoustic homing torpedo, said test set comprising, in combination:

first oscillator means for continuously generating a reverberation signal corresponding in frequency to the center-frequency of underwater reverberation, second oscillator means for continuously generating a target signal corresponding in frequency to the Doppler-shifted frequency of an underwater target signal, and a signal control circuit having first, second and third relay circuits operative to respond to search - pulses received from said torpedo via said inverse transducer, and function selector switches, arranged to control application of said reverberation and target signals to said inverse transducer in a manner simulating any selected mode of torpedo operation.

2. An inverse transducer device for use in transmission of acoustic signals to the generally convexly-faced transducer of an acoustic-homing torpedo, under test, in a manner simulating underwater target signals, said device comprising:

a hermetic housing having two opposite ends thereof formed as normally planar flexible diaphragms,
one said diaphragm serving as the face of said device,
said housing being filled with liquid,
whereby said device is adapted to accommodate intimate face-to-face contact with said torpedo transducer,
an array of electro-acoustic transducer elements supported within said housing with the acoustic axis of said array extending through said face,
and said diaphragms and liquid having acoustic transmission characteristics substantially duplicating that of seawater.

3. An inverse transducer device for use in transmission of acoustic signals to the transducer of an acoustic homing torpedo, under test, in a manner simulating underwater off-axis target signals, said device comprising:

a hermetic housing having a face portion substantially perpendicular to a reference axis defined in said housing,
an array of electro-acoustic transducer elements contained within said housing and having an acoustic axis directed generally toward said face portion and intersecting said reference axis at a point beyond said face portion,
said array being externally controllable to position said array at selected angular displacements of its acoustic axis about said reference axis,
said housing and face portion being constructed to accommodate intimate face-to-face contact with said torpedo transducer,
said housing being filled with liquid,
and said face portion and liquid having acoustic transmission characteristics substantially duplicating that of seawater.

* * * * *